(12) United States Patent
Chen et al.

(10) Patent No.: US 12,025,041 B2
(45) Date of Patent: Jul. 2, 2024

(54) CATALYTIC ARTICLE AND THE USE THEREOF FOR THE TREATMENT OF AN EXHAUST GAS

(71) Applicant: JOHNSON MATTHEY PUBLIC LIMITED COMPANY, London (GB)

(72) Inventors: Hai-Ying Chen, Wayne, PA (US); Eric Tyo, Wayne, PA (US)

(73) Assignee: Johnson Matthey Public Limited Company, London (GB)

(*) Notice: Subject to any disclaimer, the term of this patent is extended or adjusted under 35 U.S.C. 154(b) by 488 days.

(21) Appl. No.: 16/796,982

(22) Filed: Feb. 21, 2020

(65) Prior Publication Data

US 2020/0271031 A1    Aug. 27, 2020

Related U.S. Application Data

(60) Provisional application No. 62/808,360, filed on Feb. 21, 2019.

(51) Int. Cl.
| | |
|---|---|
| *F01N 3/28* | (2006.01) |
| *F01N 3/10* | (2006.01) |
| *F01N 13/00* | (2010.01) |

(52) U.S. Cl.
CPC ......... *F01N 3/101* (2013.01); *F01N 13/0093* (2014.06); *F01N 13/0097* (2014.06); *F01N 3/28* (2013.01); *F01N 2340/02* (2013.01)

(58) Field of Classification Search
CPC .. F01N 3/101; F01N 13/0093; F01N 13/0097; F01N 2570/16
See application file for complete search history.

(56) References Cited

U.S. PATENT DOCUMENTS

| | | | |
|---|---|---|---|
| 4,202,301 A | 5/1980 | Early et al. | |
| 6,497,851 B1 | 12/2002 | Hu et al. | |
| 7,922,988 B2 | 4/2011 | Deeba et al. | |
| 8,640,440 B2 | 2/2014 | Klingmann et al. | |
| 2001/0007192 A1* | 7/2001 | Suzuki | F01N 3/101 |
| | | | 60/285 |
| 2001/0037643 A1* | 11/2001 | Kubo | F02D 41/0275 |
| | | | 60/301 |

(Continued)

FOREIGN PATENT DOCUMENTS

| | | |
|---|---|---|
| CN | 1218423 A | 6/1999 |
| CN | 102083531 A | 6/2011 |

(Continued)

*Primary Examiner* — Jonathan R Matthias
(74) *Attorney, Agent, or Firm* — BakerHostetler

(57) ABSTRACT

A close-coupled catalytic article, and its use in an exhaust system for internal combustion engines, is disclosed. The close-coupled catalytic article for the treatment of an exhaust gas comprising: an upstream substrate and a downstream substrate, wherein the upstream substrate is spaced apart from the downstream substrate, wherein the upstream substrate comprises a first three-way catalyst (TWC) composition and the downstream substrate comprises a second TWC composition, the first and second TWC compositions each comprising an oxygen storage component (OSC), wherein a loading of the OSC in the downstream substrate is greater than a loading of the OSC in the upstream substrate and is at least 2.2 g/in$^3$.

19 Claims, 2 Drawing Sheets

(56) References Cited

U.S. PATENT DOCUMENTS

| | | |
|---|---|---|
| 2004/0182070 A1 | 9/2004 | Goralski, Jr. |
| 2008/0066458 A1* | 3/2008 | Toyoda .................. F01N 3/101 60/299 |
| 2010/0061903 A1* | 3/2010 | Kohara ................ B01J 37/0244 423/213.2 |
| 2011/0252773 A1 | 10/2011 | Arnold et al. |
| 2018/0353905 A1 | 12/2018 | Li et al. |
| 2019/0091662 A1 | 3/2019 | Camm et al. |

FOREIGN PATENT DOCUMENTS

| | | |
|---|---|---|
| CN | 104968415 A | 10/2015 |
| CN | 105283241 A | 1/2016 |
| CN | 108138618 A | 6/2018 |
| EP | 2 127 744 A1 | 12/2009 |
| EP | 2650042 A1 | 10/2013 |
| JP | 2006022779 A | 1/2006 |
| JP | 2008240622 A | 10/2008 |
| JP | 2010036103 A | 2/2010 |
| RU | 2651029 C2 | 4/2018 |
| WO | 2008/093471 A1 | 8/2008 |
| WO | 2015/049110 A1 | 4/2015 |
| WO | 2018024546 A1 | 2/2018 |
| WO | 2018024547 A1 | 2/2018 |

\* cited by examiner

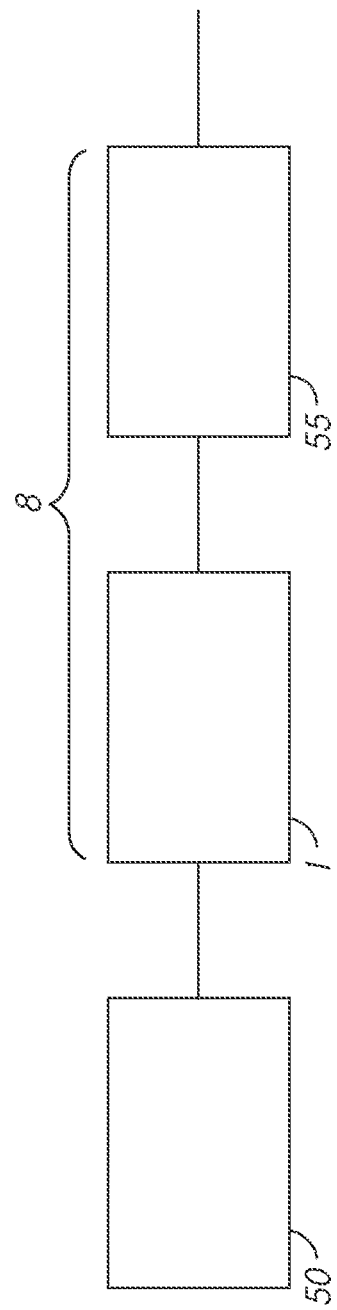

CATALYTIC ARTICLE AND THE USE THEREOF FOR THE TREATMENT OF AN EXHAUST GAS

This disclosure relates to a catalytic article for the treatment of an exhaust gas. In particular the disclosure relates to a close coupled TWC catalytic article for treating exhaust gas from an internal combustion engine.

Three-way catalysts (TWCs) are intended to catalyse three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. The active components in a typical TWC comprise one or more of platinum, palladium and rhodium, supported on a high surface area oxide, and an oxygen storage component.

The three reactions occur most efficiently when the TWC receives exhaust gas from an engine running at or about the stoichiometric point. As is well known in the art, the quantity of carbon monoxide (CO), unburned hydrocarbons (HC) and nitrogen oxides (NOx) emitted when fuel is combusted in an internal combustion engine is influenced predominantly by the air-to-fuel ratio in the combustion cylinder. An exhaust gas having a stoichiometrically balanced composition is one in which the concentrations of oxidising gases (NOx and $O_2$) and reducing gases (HC and CO) are substantially matched. The air-to-fuel ratio that produces this stoichiometrically balanced exhaust gas composition is typically given as 14.7:1.

A way of defining the compositional balance between oxidising gases and reducing gases of the exhaust gas is the lambda ($\lambda$) value of the exhaust gas, which can be defined as: Actual engine air-to-fuel ratio/Stoichiometric engine air-to-fuel ratio. A lambda value of 1 represents a stoichiometrically balanced (or stoichiometric) exhaust gas composition. A lambda value of >1 represents an excess of $O_2$ and NOx and the composition is described as "lean". A lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates.

It should be appreciated that the reduction of NOx to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas within the TWC at as close to the stoichiometric composition as possible.

When the exhaust gas composition is slightly rich of the set point, there is a need for a small amount of oxygen to consume the unreacted CO and MC, i.e. to make the gas composition more stoichiometric. Conversely, when the exhaust gas goes slightly lean, the excess oxygen needs to be consumed. This was achieved by the development of the oxygen storage component (OSC) that liberates oxygen when the exhaust composition is slightly rich or absorbs oxygen when the exhaust composition is slightly lean. The most commonly used OSC in modern TWCs is cerium oxide ($CeO_2$, also referred to as ceria) or a mixed oxide containing cerium, e.g. a Ce/Zr mixed oxide.

It is known to combine different TWC catalysts, either on the same or different bricks, or by zoning. U.S. Pat. No. 6,497,851 discloses an exhaust gas treatment apparatus having an upstream catalyst and a downstream catalyst. The upstream catalyst has a catalytic material that is substantially free of oxygen storage component. The downstream catalyst has a catalytic material that is effective for at least the oxidation of hydrocarbons and comprises one or more catalytic metal components dispersed on a refractory metal oxide support and an oxygen storage component. By excluding the oxygen storage components from the upstream catalyst, the amount of CO oxidation in the upstream catalyst is reduced and thus the operating temperature is reduced. Accordingly, the durability of the upstream catalyst may be improved.

U.S. Pat. No. 8,640,440 discloses a catalytically active particulate filter for the removal of particulates from the exhaust gas of internal combustion engines. The filter has a catalytically active coating which consists of two layers, both layers comprising an active alumina. The alumina in the first layer is catalytically activated with palladium. The second layer comprises rhodium and an oxygen storing cerium/zirconium mixed oxide. The first layer is in direct contact with the incoming exhaust gas and the second layer is in direct contact with the outgoing exhaust gas.

U.S. Pat. No. 7,922,988 discloses an exhaust gas treatment system having a catalytic material with an upstream zone and a downstream zone. The catalytic material comprises a carrier, an inner layer and an outer layer. The inner layer comprises a support and a palladium component. In the upstream zone, the inner layer of the catalytic material comprises a first oxygen storage component. In the downstream zone, the inner layer of the catalytic material comprises a second oxygen storage component. The second oxygen storage component is present in an amount greater than the first oxygen storage component.

When the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. It is known to control the air-to-fuel ratio by using an engine control unit, which receives information about the exhaust gas composition from an exhaust gas oxygen (EGO) (or lambda) sensor; a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz). Exhaust gas oxygen sensors used in a closed loop feedback system to control the air-to-fuel ratio are discussed in U.S. Pat. No. 4,202,301A.

Accordingly, it is an object to provide an improved TWC catalyst tackling the disadvantages of the prior art, or at least to provide a commercially useful alternative thereto. More specifically, it is an object to provide a TWC catalyst that enables efficient treatment of exhaust gas despite the time lag for adjusting the air-to-fuel ratio.

Accordingly, in a first aspect of the present invention there is provided a close-coupled catalytic article for the treatment of an exhaust gas, the article comprising an upstream substrate and a downstream substrate, wherein the upstream substrate is spaced apart from the downstream substrate, wherein the upstream substrate comprises a first three-way catalyst (TWC) composition and the downstream substrate comprises a second TWO composition, the first and second TWC compositions each comprising an oxygen storage component (OSC), wherein a loading of the OSC in the downstream substrate is greater than a loading of the OSC in the upstream substrate and is at least 2.2 g/in$^3$.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present disclosure relates to a close-coupled catalytic article for the treatment of an exhaust gas. A catalytic article as used herein refers to a component of an exhaust gas system, in particular a TWC catalyst for the treatment of an exhaust gas. The catalytic article described herein comprises the multiple sub-components described herein.

By "close-coupled" it is meant that the catalytic article is for installation in close proximity to the exhaust manifold of an engine. That is, preferably the catalytic article is for installation in the engine bay and not under the floor of the vehicle. Preferably the catalytic article is the first catalyst article provided downstream of the engine manifold. The close-coupled position may become very hot due to proximity to the engine.

The inventors have discovered that hydrocarbon (HC), NOx and CO emissions can be reduced, typically by more than 25%, by providing a downstream substrate spaced apart from an upstream substrate, the downstream substrate being provided with a TWC composition having at least 2.2 g/in$^3$ of an OSC, which is greater than the OSC loading of the TWC composition of the upstream substrate. By providing the upstream substrate spaced apart from the downstream substrate, oxygen sensors may be used to monitor the oxygen level across the upstream substrate. The air-to-fuel ratio of the exhaust gas may then be accurately adjusted based on the oxygen levels across the upstream substrate. Due to the time lag associated with the adjustment, the gas entering the downstream substrate may still have excess NOx or HC/CO that was not treated by the upstream substrate. In the TWC of the downstream substrate, at least 2.2 g/in$^3$ of OSC is provided. This loading of OSC enables sufficient oxygen to be absorbed/released in order to avoid undesirable species being released further into the exhaust system before the air-to-fuel ratio of the exhaust gas from the engine has been corrected. Therefore, the catalytic article enables efficient treatment of exhaust gas despite the time lag for adjusting the air-to-fuel ratio.

The catalytic article comprises an upstream substrate and a downstream substrate, each of which comprises a TWC catalyst composition. By upstream it is meant that, in use, the substrate is closer to the engine manifold vis-a-vis the flow of the exhaust gas leaving the engine. Similarly, each substrate will have an end which is "upstream" since, in use, it is closer to the engine manifold. This means that the exhaust gas leaving the engine first contacts the upstream end of the upstream substrate. The downstream end of the downstream substrate is where the exhaust gas leaves the catalytic article and progresses through the exhaust system.

Each of the upstream and downstream substrates may comprise a plurality of channels (e.g. for the exhaust gas to flow through). Each of the upstream and downstream substrates maybe a metal or ceramic substrate.

Each of the upstream and downstream substrates may be a monolith. Monoliths are well-known in the art. Each monolith may be a flow-through monolith or a filtering monolith suitable for filtering particulates from combustion engine exhaust gas, such as diesel exhaust.

Preferably the upstream and or downstream substrates are each a flow-through monolith. Flow-through monoliths are well known in the art and typically comprise a plurality of channels through which the exhaust gas flows in use. The channels are provided with the catalyst material for treating the exhaust gas. The channels may have porous walls for increasing the surface area of catalyst with which the exhaust gas can be treated. Preferably the flow-through monolith comprises cordierite, cordierite-α alumina, silicon nitride, zircon mullite, spodumene, alumina-silica magnesia, zircon silicate, sillimanite, magnesium silicate, zircon, petalite, α-alumina, or an aluminosilicate. The substrates may have a porosity of 20 to 75%, such as 30 to 70% (e.g. 45 to 65%) or 35 to 60%.

Preferably the catalytic article is provided in a single can or housing. That is, the upstream and downstream substrates are held relative to one another as a single component, such that their orientation and spacing can be maintained relative to the gas flow. This is particularly important for reliable oxygen sensing. Alternatively the upstream and downstream substrates can be provided in separate housings.

The upstream substrate is spaced apart from the downstream substrate. Preferably the upstream substrate is spaced apart from the downstream substrate by from 1 to 5 cm, preferably from 2 to 3 cm. The distance is measured in relation to the gas-flow pathway between the downstream face of the upstream substrate and the upstream face of the downstream substrate. This spacing helps to minimise the catalyst article dimensions, while ensuring that reliable oxygen sensing measurements can be taken.

The first and second substrates can be described in relation to their volume. Preferably the upstream substrate has a similar volume to the downstream substrate, such as having a relative size ratio of the upstream substrate to the downstream substrate of from 2:1 to 1:2, preferably 3:2 to 2:3 and most preferably about 1:1.

The upstream substrate comprises a first three-way catalyst (TWC) composition and the downstream substrate comprises a second TWC composition. TWC compositions are well known in the art and the specific components may readily be selected by a person skilled in the art. The TWC typically comprises one or more platinum group metals (PGM) provided on a high surface area support, together with an oxygen storage component (OSC) which typically comprises ceria. TWC compositions are generally provided in washcoats onto the substrate.

An OSC is an entity that has multi-valence state and can actively react with oxidants such as oxygen or nitrous oxides under oxidative conditions, or reacts with reductants such as carbon monoxide (CO) or hydrogen under reducing conditions. Suitable oxygen storage components include cerium-containing species, for example, ceria or cerium-containing mixed oxides. Praseodymia can also be included as an OSC. Preferably, the OSC comprises or consists of one or more mixed oxides. The OSC can be ceria or a mixed oxide comprising cerium. The OSC may comprise ac mixed oxide of cerium and zirconium; a mixed oxide of cerium, zirconium, and neodymium; a mixed oxide of praseodymium and zirconium; a mixed oxide of cerium, zirconium and praseodymium; or a mixed oxide of praseodymium, cerium, lanthanum, yttrium, zirconium and neodymium. The OSC of the first and second TWCs may each independently comprise ceria or a cerium-containing mixed oxide. Preferably the OSC of the first and second TWCs each independently are selected from the group consisting of cerium oxide, a ceria-zirconia mixed oxide, and an alumina-ceria-zirconia mixed oxide.

A loading of the OSC in the downstream substrate is greater than a loading of the OSC in the upstream substrate and is at least 2.2 g/in$^3$. Preferably the loading of the OSC in the downstream substrate is from 2.2 to 4 g/in$^3$, preferably from about 2.4 to about 2.6 g/in$^3$ and most preferably about 2.5 g/in$^3$. Preferably the loading of the OSC in the upstream substrate is from about 0.5 to about 2 g/in$^3$, preferably from about 1 to about 1.5 g/in$^3$ and most preferably about 1.3 g/in$^3$. Preferably the loading of the OSC in the downstream substrate is at least 0.4 g/in$^3$ higher than the loading in the upstream substrate. More preferably, the loading of the OSC in the downstream substrate is at least 1 g/in$^3$ greater than the loading of the OSC in the upstream substrate.

When the loading of the OSC in the upstream substrate is below 0.5 g/in$^3$ the TWC properties of the upstream substrate may be insufficient to tackle the treatment of the exhaust gas when the engine is running rich or lean. When the loading of the OSC in the upstream substrate is above 1.5 g/in$^3$ the cost benefits of the claimed arrangement are reduced.

When the loading of the OSC in the downstream substrate is below 2.2 g/in$^3$ the downstream substrate may not be able to suitably respond to changes in the engine stoichiometry because the oxygen storage is insufficient. When the loading of the OSC in the upstream substrate is above 4 g/in$^3$ the cost and complexity of manufacturing the downstream substrate are undesirably high.

The total content of a catalyst component on a substrate may be determined by reference to the substrate volume and the loading of the catalyst component. Preferably, the total content (i.e. total mass) of OSC in the downstream substrate is greater than the total content of OSC in the upstream substrate.

Where the OSC of the first and second TWCs each independently comprise ceria or a cerium-containing mixed oxide, the total cerium content (i.e. the total mass of cerium atoms present) in the downstream substrate may be greater than the total cerium content in the upstream substrate. Preferably, the total cerium content in the downstream substrate is at least 35% greater than the total cerium content in the upstream substrate, more preferably at least 40% greater, most preferably at least 45% greater.

The first and second TWC compositions each comprise an oxygen storage component (OSC). Preferably the components forming the OSC are the same, although the loading differs as described above.

Preferably, apart from the OSC component and the loading of the PGMs (discussed below), the first and second TWCs may be substantially the same, in order to reduce manufacturing complexity.

Preferably the first and/or the second TWC compositions each comprise one or more platinum group metals (PGM) selected from Pd, Pt and Rh on a support, preferably wherein the first and/or second TWC compositions comprise Pd and Rh provided in separate layers. The palladium component and the rhodium component may have a weight ratio of from 200:1 to 1:200. Preferably, the palladium component and the rhodium component has a weight ratio of from 100:1 to 1:100. More preferably, the palladium component and the rhodium component has a weight ratio of from 50:1 to 1:50. Most preferably, the palladium component and the rhodium component may have a weight ratio of from 15:1 to 1:15. Preferably, the first TWC composition has a greater loading of palladium than the second TWC composition.

The support for the PGMs may be independently selected from the group consisting of alumina, silica-alumina, alumina-silicates, alumina-zirconia, alumina-ceria, and alumina-lanthanum. Suitable supports are well known in the art. Preferably the high surface area support has a surface area of at least 70 m$^2$/g, for example at least 80 m$^2$/g, at least 150 m$^2$/g or at least 200 m$^2$/g.

According to a further aspect there is provided an exhaust gas treatment system comprising the close-coupled catalytic article as described herein.

As desired, the exhaust system can also include additional components, such as further catalysts or filters. Examples of further components include a NOx trap, a hydrocarbon trap, a selective catalytic reduction (SCR) catalyst, a catalysed soot filter (CSF), a selective catalytic reduction filter (SCRF™) catalyst, an ammonia slip catalyst (ASC), a gasoline particulate filter (GPF), and combinations of two or more thereof. Such components are all well known in the art.

Preferably the exhaust gas treatment system further comprises first and second oxygen sensors arranged to monitor oxygen levels across the upstream substrate. That is, a first oxygen sensor is located upstream of the upstream substrate and a second oxygen sensor is located downstream, of the upstream substrate. This means that oxygen levels can be assessed on the exhaust gases before and after treatment in the upstream substrate. Oxygen sensors are well known and any conventional oxygen sensor can be suitably employed.

As desired, after leaving the catalyst article described herein, optionally the exhaust gas stream can next be conveyed to further components of the exhaust system via an appropriate exhaust pipe.

In one embodiment, after leaving the catalytic article described herein, the exhaust gas stream can next be conveyed to a downstream NOx trap for adsorbing any remaining NOx emission contaminants in the exhaust gas stream. From the NOx trap through a further exhaust pipe, a SCR catalyst can be disposed to receive the outlet of the NOx trap to provide further emissions treatment of any ammonia generated by the NOx trap with a selective catalytic reduction catalyst for reducing oxides of nitrogen to form nitrogen and water using the ammonia as reductant. From the SCR catalyst, an exhaust pipe can lead to the tail pipe and out of the system.

According to a further aspect there is provided a gasoline engine comprising the exhaust gas system as described herein. Additionally, the present disclosure can comprise a vehicle, such as a passenger vehicle, comprising an engine as described herein.

According to a further aspect there is provided a method of treating an exhaust gas from an internal combustion engine comprising the exhaust gas treatment system as described herein and further comprising means to adjust an air-to-fuel ratio within the engine, the method comprising:

monitoring oxygen levels across the upstream substrate and adjusting the air-to-fuel ratio in response to changes in the monitored oxygen levels. The air-fuel ratio is routinely controlled in modern gasoline engines using a controller.

The invention will now be described in relation to the following non-limiting figures, in which:

FIG. 2 shows an exhaust treatment system comprising the catalytic article described herein and an engine.

Figure 1:
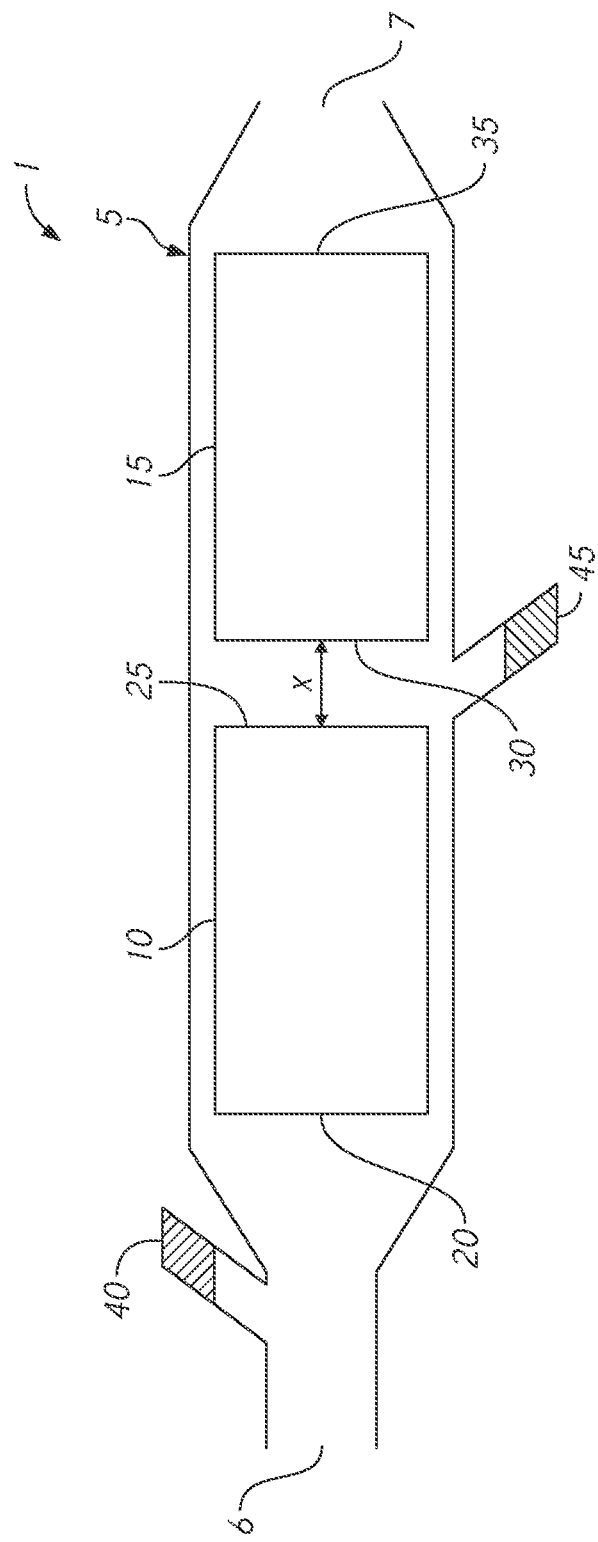
FIG. 1 shows a catalytic article as described herein.

FIG. 1 shows a catalyst article 1 comprising a housing 5 which forms part of an exhaust gas treatment system. The housing 5 contains an upstream brick 10 and a downstream brick 15 (also referred to as upstream and downstream substrates herein). The housing 5 is generally cylindrical and the upstream and downstream bricks 10, 15 are correspondingly shaped so as to fill the housing 5. The housing 5 has an inlet 6 for receiving an exhaust gas from a combustion engine (not shown in FIG. 1). The housing 5 has an outlet 7 for the treated exhaust gas passing onwards in the exhaust gas treatment system (such as to a hydrocarbon trap).

The upstream and downstream bricks 10, 15 are monolithic honeycomb flow-through substrates made of cordierite. The upstream brick 10 has a generally flat circular upstream-facing face 20 and a generally flat circular downstream-facing face 25. The downstream brick 15 has a generally flat circular upstream-facing face 30 and a generally flat circular downstream-facing face 35. The downstream-facing face 25 of the upstream brick 10 is spaced from the upstream-facing face 35 of the downstream brick by a spacing X.

The upstream brick 10 comprises a TWC composition. For example, the composition comprises Pd, Rh, alumina and an ©SC component. The downstream brick 15 also comprises a TWC composition. For example, the composition comprises Pd, Rh, alumina and an OSC component. The loading of the OSC component in the upstream brick 10 is less than the loading in the downstream brick 15.

The spacing X is about 2-3 cm. Since the downstream-facing face 25 of the upstream brick 10 and the upstream-facing face 30 are substantially parallel, the spacing X is substantially constant.

The catalyst article 1 comprises a first oxygen sensor 40 and a second oxygen sensor 45. The first oxygen sensor 40 is located upstream of the upstream brick 10. Although the first oxygen sensor 40 has been shown as part of the housing 5, it could also be provided separately upstream. The second oxygen sensor 45 is located upstream of the downstream brick 15 and downstream of the upstream brick 10.

The oxygen sensors 40, 45 are standard devices and work to determine the level of oxygen is present in the gas presented to the sensor. Therefore the sensors 40, 45 require access to the gases flowing through the housing 5. The sensor may be remote from the housing 5, provided they can be used to measure the associated gases. The spacing X serves to provide a region of the exhaust gases between the upstream brick 10 and the downstream brick 15 on which the oxygen measurement can be performed.

FIG. 2 shows an internal combustion engine 50 in gaseous communication with the catalyst article 1. The catalyst article 1 is further in gaseous communication with the remainder 55 of the exhaust gas treatment system 8, which comprises at least an outlet to the environment, but can also comprise other catalyst articles (such as gasoline particulate filter, a hydrocarbon trap and/or an SCR catalyst).

In use, an exhaust gas from a combustion engine 50 exits the engine 50 and flows to the catalyst article 1, passing the first oxygen sensor 40 on the way. The first oxygen sensor 40 monitors the level of oxygen and relays this information to a controller of the air/fuel ratio in the engine 50.

The exhaust gas then contacts the upstream brick 10 where the TWC catalyst treats at least a portion of the exhaust gas. The exhaust gas then leaves the upstream brick 10 and enters the spacing X between the upstream and downstream bricks 10, 15. The second oxygen sensor 45 monitors the level of oxygen and passes this information to a controller of the air/fuel ratio in the engine 50.

The exhaust gas then passes to the downstream brick 15 where the TWC catalyst treats at least a portion of the exhaust gas. The exhaust gas then leaves the downstream brick 15, out of the outlet 7 and enters the remainder of the exhaust gas treatment system 55

The controller manipulates the air/fuel ratio based on the oxygen level data obtained from the oxygen sensors 40, 45. Based on the information provided, the air/fuel ratio can be dynamically controlled in the engine to address undesirably lean or rich conditions. The presence of the downstream brick 15 after the second oxygen sensor 45 allows catalyst article 1 to smooth out any rich or lean peaks while the air/fuel ratio is being adjusted.

The fuel injection control required to operate positive ignition engines is obtained through highly pressurised common rail fuel injections systems and the engines are referred to as gasoline Direct Injection (GDI) engines, alternatively spark ignition direct injection (SIDI) or Fuel Stratified Injection (FSI).

EXAMPLES

The invention will now be described in relation to the following non-limiting examples.

Three catalyst articles (Examples 1 to 3) were tested for their performance in treating an exhaust gas from a gasoline engine. The articles each were provided with two catalytic bricks washcoated with TWC catalysts. The bricks were made of cordierite and had the same size and porosity. In each catalyst article, the space between the two bricks was 1 inch (25.4 mm).

The upstream catalytic bricks were identical in each of the three catalyst articles. In each example, the upstream brick was washcoated with a three-way (Pd—Rh) catalyst with CeZr mixed oxide as the OSC, wherein Pd and Rh were provided in separate layers. Each upstream brick had a total washcoat loading, total OSC loading and total cerium loading of 2.75 g/in$^3$, 1.3 g/in$^3$ and 750 g/ft$^3$ respectively and the PGM ratio (Pt:Pd:Rh) was 0:63:6.5 g/ft$^3$.

The downstream bricks were each washcoated with a three-way (Pd—Rh) catalyst with CeZr mixed oxide as the OSC, wherein Pd and Rh were provided in separate layers, with a PGM ratio (Pt:Pd:Rh) of 0:27:6.5 g/ft$^3$. However, the OSC loading in the downstream brick was changed in each example.

In Example 1 (comparative), the downstream brick had a total washcoat loading, a total OSC loading and a total cerium loading of 2.75 g/in$^3$, 1.3 g/in$^3$ and 750 g/ft$^3$ respectively.

In Example 2 (comparative), the downstream brick had a total washcoat loading, a total OSC loading and a total cerium loading of 3.23 g/in$^3$, 1.8 g/in$^3$ and 1100 g/ft$^3$ respectively.

In Example 3 (inventive), the downstream brick had a total washcoat loading, a total OSC loading and a total cerium loading of 3.93 g/in$^3$, 2.5 g/in$^3$ and 1400 g/ft$^3$ respectively.

The catalyst articles (Examples 1 to 3) underwent an accelerated aging to an equivalent of 150000 miles. Once aged, the catalyst articles were tested using a 2018 1.5L GTDI SULEV30 compliant passenger car under the Federal Test Procedure (FTP).

The oxygen levels were measured across the upstream brick in each case and used to control the air to fuel ratio. The levels of NOx, non-methane hydrocarbons (NMHC) and CO leaving the downstream brick were measured during the treatment process.

Analysis

| Example | FTP testing | | | |
|---|---|---|---|---|
| | NMHC (g/mile) | NOx (g/mile) | NMHC & NOx (g/mile) | CO (g/mile) |
| 1 (comparative) | 0.017 | 0.006 | 0.023 | 0.57 |
| 2 (comparative) | 0.013 | 0.011 | 0.024 | 0.53 |
| 3 (inventive) | 0.012 | 0.006 | 0.018 | 0.42 |

As shown in the above results, NMHC+NOx and CO emissions can be reduced by more than 20% with a rear catalyst having high OSC levels. This serves to address a slow NF ratio feedback loop which would otherwise result in lean/rich spikes passing into the rear brick with excess NOx or HC/CO.

Unless otherwise stated, all percentages herein are by weight.

Although preferred embodiments of the invention have been described herein in detail, it will be understood by those skilled in the art that variations may be made thereto without departing from the scope of the invention or of the appended claims.

The invention claimed is:

1. A close-coupled catalytic article for the treatment of an exhaust gas, the article comprising an upstream substrate and a downstream substrate,
wherein the upstream substrate is spaced apart from the downstream substrate,
wherein the upstream substrate comprises a first three-way catalyst (TWC) composition and the downstream substrate comprises a second TWC composition, the first and second TWC compositions each comprising an oxygen storage component (OSC),
wherein a loading of the OSC in the downstream substrate is greater than a loading of the OSC in the upstream substrate and is at least 2.2 g/in$^3$, and
wherein the upstream substrate is spaced apart from the downstream substrate by from 1 to 5 cm.

2. The close-coupled catalytic article according to claim 1, wherein the loading of the OSC in the downstream substrate is from 2.2 to 4 g/in$^3$.

3. The close-coupled catalytic article according to claim 1, wherein the loading of the OSC in the upstream substrate is from 0.5 to 2 g/in$^3$.

4. The close-coupled catalytic article according to claim 1, wherein the loading of the OSC in the upstream substrate is at least 0.4 g/in$^3$, lower than the loading in the downstream substrate.

5. The close-coupled catalytic article according to claim 1, wherein a ratio of a volume of the upstream substrate to a volume of the downstream substrate is from 2:1 to 1:2.

6. The close-coupled catalytic article according to claim 1 wherein the total content of OSC in the downstream substrate is greater than the total content of OSC in the upstream substrate.

7. The close-coupled catalytic article according to claim 1, wherein the first and/or the second TWC compositions each comprise one or more platinum group metals selected from Pd, Pt and Rh on a support.

8. The close-coupled catalytic article according to claim 7, wherein the support for the platinum group metals is selected from the group consisting of alumina, silica-alumina, alumino-silicates, alumina-zirconia, alumina-ceria and alumina-lanthanum.

9. The close-coupled catalytic article according to claim 1, wherein the OSC of the first and second TWCs each independently comprise ceria or a cerium-containing mixed oxide.

10. The close-coupled catalytic article according to claim 9 wherein the total cerium content in the downstream substrate is greater than the total cerium content in the upstream substrate.

11. The close-coupled catalytic article according to claim 10 wherein the total cerium content in the downstream substrate is at least 35% greater than the total cerium content in the upstream substrate.

12. The close-coupled catalytic article according to claim 1, wherein the OSC of the first and second TWCs each independently are selected from the group consisting of cerium oxide, a ceria-zirconia mixed oxide, and an alumina-ceria-zirconia mixed oxide.

13. The close-coupled catalytic article according to claim 1, wherein first and or second substrates are each a flow-through monolith.

14. The close-coupled catalytic article according to claim 1, provided in a single can or housing.

15. An exhaust gas treatment system comprising the close-coupled catalytic article according to claim 1.

16. The exhaust gas treatment system according to claim 15 and further comprising first and second oxygen sensors arranged to monitor oxygen levels across the upstream substrate.

17. A method of treating an exhaust gas from an internal combustion engine comprising the exhaust gas treatment system according to claim 16 and further comprising means to adjust an air-to-fuel ratio within the engine, the method comprising:
monitoring oxygen levels across the upstream substrate and adjusting the air-to-fuel ratio in response to changes in the monitored oxygen levels.

18. A gasoline engine comprising the exhaust gas treatment system according to claim 15.

19. The close-coupled catalytic article according to claim 1, wherein the catalytic article is not under the floor.

* * * * *